United States Patent
Stegelmann

(10) Patent No.: US 10,289,611 B2
(45) Date of Patent: May 14, 2019

(54) GLOBAL AND PERSISTENT MEMORY FOR USER-DEFINED FUNCTIONS IN A PARALLEL DATABASE

(75) Inventor: Rolf Gunter Erich Stegelmann, Valencia, CA (US)

(73) Assignee: Teradata US, Inc., Dayton, OH (US)

(*) Notice: Subject to any disclaimer, the term of this patent is extended or adjusted under 35 U.S.C. 154(b) by 587 days.

(21) Appl. No.: 13/097,169

(22) Filed: Apr. 29, 2011

(65) Prior Publication Data

US 2011/0270896 A1  Nov. 3, 2011

Related U.S. Application Data

(60) Provisional application No. 61/329,887, filed on Apr. 30, 2010.

(51) Int. Cl.
G06F 17/30 (2006.01)
G06F 16/22 (2019.01)

(52) U.S. Cl.
CPC ............... G06F 16/2291 (2019.01)

(58) Field of Classification Search
CPC .. G06F 12/02; G06F 17/30415; G06F 3/0646; G06F 3/0647; G06F 8/458; G06F 17/30165; G06F 17/30168; G06F 17/30171

USPC ......... 711/117, 148, 150, 152, 153, 202–209
See application file for complete search history.

(56) References Cited

U.S. PATENT DOCUMENTS

| | | | |
|---|---|---|---|
| 6,643,757 B2 | 11/2003 | Johannes et al. | |
| 7,222,119 B1* | 5/2007 | Ghemawat et al. | |
| 7,600,063 B2* | 10/2009 | Loaiza et al. | 710/200 |
| 7,856,382 B2 | 12/2010 | Kim et al. | |
| 2010/0122077 A1* | 5/2010 | Durham | 713/100 |

OTHER PUBLICATIONS

FinalVersion, "Memory UDF", UTOIT, Mar. 31, 2010, pp. 4. http://www.autoitscript.com/forum/topic/112403-memory-udf.*

* cited by examiner

Primary Examiner — Amanda L Willis
(74) Attorney, Agent, or Firm — Schwegman, Lundberg & Woessner, P.A.

(57) ABSTRACT

User Defined Functions (UDFs) for a parallel database system are enhanced by making memory persist even when the UDFs terminate. The memory can be shared between different instances of the UDF and the memory can be custom mapped, encrypted, and use custom security.

16 Claims, 3 Drawing Sheets

GLOBAL AND PERSISTENT MEMORY FOR USER-DEFINED FUNCTIONS IN A PARALLEL DATABASE

RELATED APPLICATIONS

The present application is a non provisional application of, and claims the benefit of Provisional Application Ser. No. 61/329,887, entitled "Global and Persistent Memory for User-Defined Functions in a Parallel Database," filed on Apr. 30, 2010; the disclosure of which is incorporated by reference herein.

BACKGROUND

User Defined Functions don't have the ability to retain data in memory that is retained longer than the length of execution of the function. They are also limited to information passed into them via their parameters. In addition in a parallel database it is not possible to share any data between different parallel instances of the User Defined Functions (UDF) running on different virtual processors and nodes for a request on the database.

SUMMARY

In various embodiments, techniques for global and persistent memory of User Defined Functions (UDFs) in a parallel database are presented. According to an embodiment, a method for providing global and persistent memory for UDFs is presented.

More particularly, a command is received from a user-defined function (UDF) of a database system to map memory that is to be used by the UDF. Next, a block of data is mapped in the database system, the block of data acquired from one or more tables in response to the command. Finally, the mapping is provided within the memory, and the mapping is accessed and is managed by the UDF via set commands issued to the mapping within the memory.

DETAILED DESCRIPTION

Figure 1:
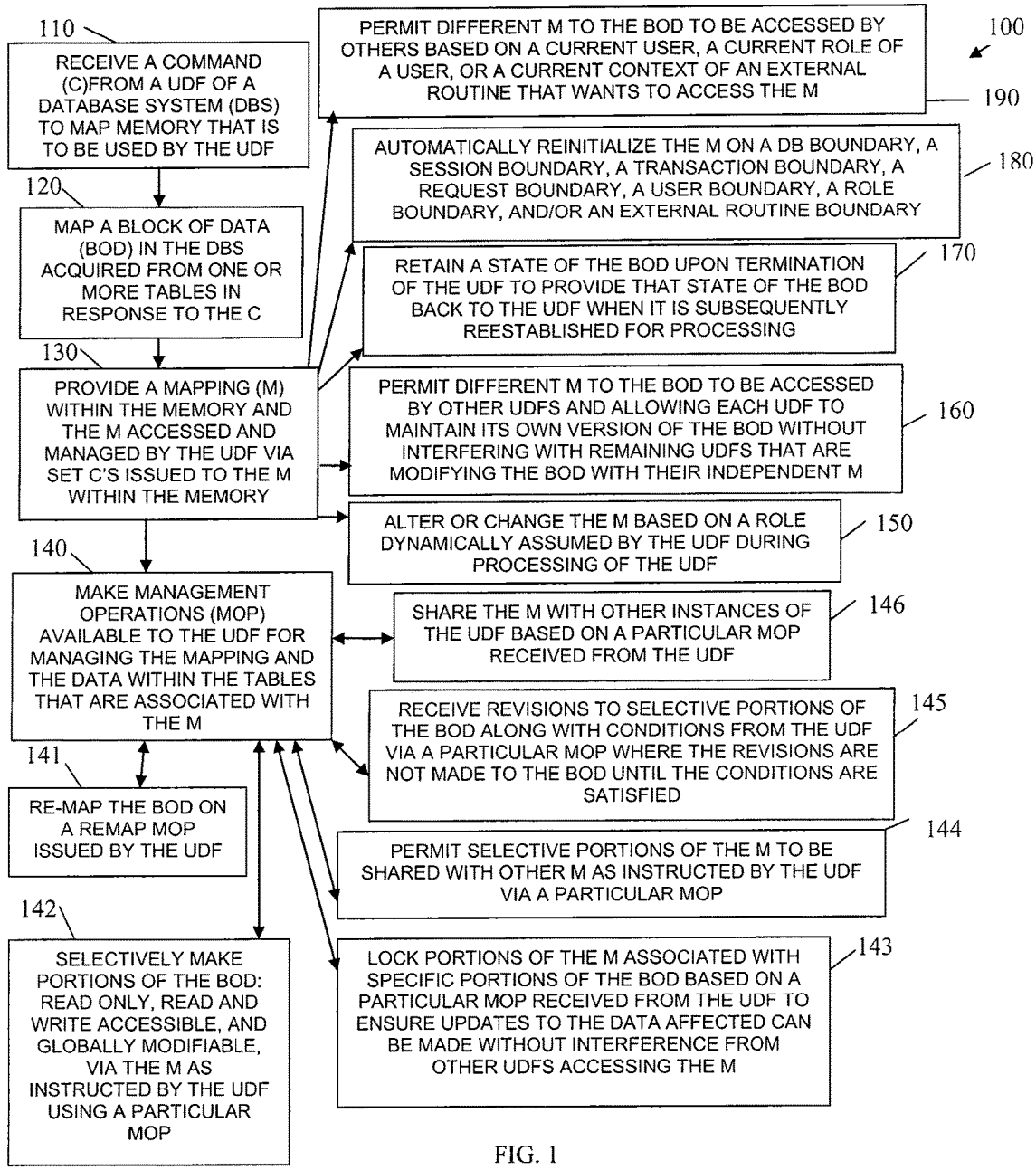
FIG. 1 is a method for providing global and persistent memory for UDFs, according to an example embodiment.

The embodiments (methods and techniques) presented herein are implemented in computer or processor-readable storage medium as instructions that execute on processors (hardware devices). The processors are specifically configured to execute the techniques taught herein and below.

The embodiments presented herein create a variety of capabilities, such as:
1. The ability to define preset data that can be mapped by a UDF.
2. The ability to modify that data individually specific to each instance of the UDF executing in each virtual processor.
3. The ability to share that data globally so that every instance sees the same data.
4. The ability to retain the data for subsequent invocations of the UDF.
5. The ability to reinitialize specific subsets of the mapped data at specific SQL boundaries pertaining to SQL transaction logic. Individual mapped memory can be automatically reinitialized on the following boundaries:
    a. System boundary—persistent until the database is restarted.
    b. Session boundary—reinitialized for every new database session and local to the session.
    c. Transaction boundary—reinitialized at the start of every transaction for a session.
    d. Request boundary—reinitialized at the start of every request for a session.
    e. User boundary—established once with each new user and persists across sessions for the same logged in user. It persists until the database is restarted.
    f. Role boundary—established once with each usage of a role by a session. It persists until the database is restarted.
    g. External Routine boundary—established once for each specific routine. All instances of the same external routine share the same mapped memory. It persists until the database is restarted.
6. The ability to map different mappings based on the current user, role, or external routine based on current context.
7. The ability to define read only, read/write and globally modifiable memory mappings of the data
8. The ability to lock read/write memory so that it can be updated without interference from other update UDFs or readers trying to read it while it is being updated.
9. The ability to share the mappings across boundaries for mappings of different types as indicated in point 5.
10. The ability to specify which page of a multiple pages of read only memory to map.
11. The ability to specify which revisions are mapped and when based on defined conditions.

The embodiments herein provide a database containing the user defined global & persistent data in ordinary database tables. The data is organized into sets with each set containing predefined data of specific length and type. The initial data is either provided with a BLOB containing the data to be established or it can be null in which case when it is mapped it is initialized to zero for the specific length.

The data for the sets is updated via provided system procedures to add a new set, remove a set, or change data in the set and to provide revisions of a set that are activated at specific predetermined conditions. The procedures update the normal specific database tables with the data and provide integrity checking and access rights checking.

When a UDF is associated with a set by adding a new clause "USING GLOP SET name" to the UDF create statement the UDF can map all data associated with that set by providing a call FNC_Get_GLOP_Map that provides the access to the mappings in the set in the prescribed manner as defined by the set.

The UDF can then read or write the mapped data as needed for its own purposes. It can lock the data with an FNC_GLOP_Lock and unlock it with an FNC_GLOP_Unlock call for update purposes.

The UDF can remap the original context of the specific type of read/write mapped memory with an FNC_GLOP_Map_Page call. It can also use that same call to map different "pages" of read only mapped memory by specifying the page to map.

The particular UDF instance can share mapped memory globally to all processors on all nodes by calling FNC_GLOP_Global_Copy to do that.

The memory is managed and mapped as needed upon first usage. On first usage if the set has never been accessed processing is undertaken to establish the set and map it on every virtual processor and all nodes on the database system. This ensures that everyone sees exactly the same data initially. If two UDFs try to establish the same set at the same type one will win out since it requires a global semaphore to allow only one instance to access to the setup logic. Once set up, the second caller sees the established set. The mapping information is retained in a memory cache. This cache has the mapping information for each set and all associations needed to track what is using the set according to the set type (see point 5). When an instance of a UDF maps a set (what is called a Quick Access structure) is created so that on subsequent calls to the UDF the complicate logic to find the appropriate set information does not have to be executed again.

The memory in a set is mapped based on the current context of the request that is executing:

1. For session type mapping each session has its own version of that memory.
2. For transaction type mapping each transaction of a session has its own version of that memory. This is different and separate from the session type mapping. It is discarded at the end of the transaction.
3. For a request type mapping each request of a session has its own version of that memory. It is discarded at the end of the request.
4. For a 'user' type mapping each different user can have a different version. If no mapping is specified for a particular user it maps nothing.
5. For a 'role' type mapping each different role can have a different version. If no mapping is specified for a particular role it maps nothing.
6. For an 'external routine' type mapping it only maps something if the specified external routine (UDF) is executing otherwise nothing is mapped. Different external routines can have different data mapped for this mapping even though they belong to the same set.

Conventional approaches simply provide a scratch pad that a UDF can use on subsequent calls. This does not provide a way to provide preset configurable data to the UDF. While that can be done by accessing a file or some pipe logic to transfer the data, the process is slow and awkward to manage and it can't be shared among all virtual processors on multiple nodes. Conventional techniques do not solve the problems discussed herein in the elegant manner taught by embodiments of the invention and conventional approached do not provide all the flexibility that the teachings herein encompass.

The following benefits are achieved with the teachings presented herein:

1. It is easy to set up a GLOP set simple standard SQL invoked stored procedures.
2. It is easy for a UDF to map the data.
3. It is flexible in that a site can provide business rules in the mapped sets that a UDF can access and act upon without forcing it to be passed as a parameter.
4. Data encryption keys can be provided in the mapped memory set to encrypt or decrypt data. The keys can be provided in the user mapped memory. That way the keys can be different for different users providing decryption capabilities based on user privileges. This is because the mapping calls always maps the correct 'USER' type of mapped memory associated with that user and does not map anything if the user does not have an associated mapping in the set.
5. It is fast because mappings are set up and not torn down unless needed. Only the memory address and length information has to be provided to the UDF.

It is within this context that specific embodiments of the invention are now discussed with reference to the FIGS. 1-3.

FIG. 1 is a method 100 for providing global and persistent memory for UDFs, according to an example embodiment. The method 100 (hereinafter referred to as "external memory manager") is implemented, resides, and is programmed within a non-transitory machine-readable storage medium for execution by one or more processors of a network. The network may be wired, wireless, or a combination of wired and wireless.

At 110, the external memory manager receives a command from a UDF of a database system to map memory that is to be used by the UDF. This can be done on initialization of the UDF or after the UDF is up and running and makes the request via the command. The external memory manager is a process of a parallel database system and provides persistent and globally accessible memory to UDFs in the manners discussed above and below.

At 120, the external memory manager maps a block of data in the database system. The block of data is acquired from one or more tables of the database system. This mapping occurs in response to the command for the mapping from the UDF. It is noted that a profile or configuration of the UDF may send the command or trigger an event that generates the command to produce the mapping. Also, the data is stored in the database as persistent and non volatile storage, so it can be used even when the UDF is terminated or restarted, as discussed above and some more below. The location of the data, the type of the data, and the length of the data can be defined via configuration or policies. In some cases, the UDF can define the block of data as well with management operations, discussed below.

At 130, the external memory manager provides a mapping within the memory. The mapping is accessed and managed by the UDF via set commands issued to the mappings within the memory.

According to an embodiment, at 140, the external memory manager makes management operations available to the UDF for managing the mapping and the data within the tables, which are accessed via the mappings.

Continuing with the embodiment of 140 and at 141, the external memory manager re-maps the block of data via a remap management operation issued by the UDF.

Continuing with the embodiment of 140 and at 142, the external memory manager selectively makes portions of the block of data read only, read and write accessible, and globally modifiable via the mapping as instructed by the UDF using a particular management operation.

Continuing with the embodiment of 140 and at 143, the external memory manager locks portions of the mapping associated with specific portions of the block of data based on a particular management operation received from the UDF to ensure that updates to the data affected can be made without interference from other UDFs accessing the mapping.

Continuing with the embodiment of 140 and at 144, the external memory manager permits selective portions of the mapping to be shared with other mappings as instructed by the UDF via a particular management operation.

Continuing with the embodiment of 140 and at 145, the external memory manager receives revisions to selective portions of the block of data along with conditions from the UDF via a particular management operation where the revisions are not made to the block of data until the conditions are satisfied.

Continuing with the embodiment of 140 and at 146, the external memory manager shares the mappings with other instances of the UDF based on a particular management operation received from the UDF.

In another case, at 150, the external memory manager alters or changes the mappings based on a role that is dynamically assigned or assumed by the UDF during processing of the UDF.

In another scenario, at 160, the external memory manager permits different mappings to the block of data to be accessed by other UDFs and allows each UDF to maintain its own version of the block of data without interfering with remaining UDFs that are modifying the block of data with their independent mappings.

In yet another situation, at 170, the external memory manager retains a state of the block of data upon termination of the UDF to provide that state of the block of data back to the UDF when it is subsequently reestablished for processing.

In another embodiment, at 180, the external memory manager automatically reinitializes the mappings on a database boundary, a session boundary, a transaction boundary, a request boundary, a user boundary, a role boundary, and/or an external routine boundary.

Still further, at 190, the external memory manager permits different mappings to the block of data to be accessed by others based on a current user, a current role of the user, and/or a current context of an external routine that wants to access the mappings.

Figure 2:
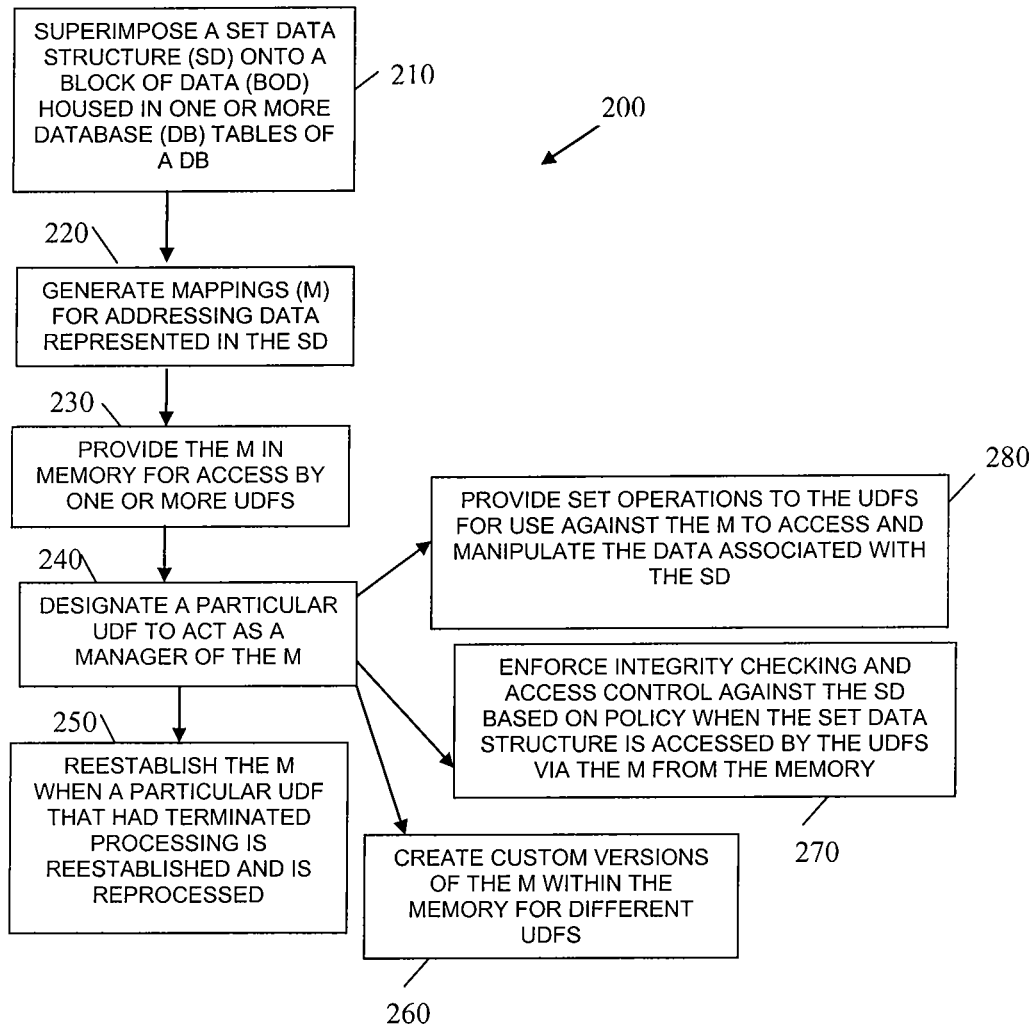
FIG. 2 is a diagram of another method for providing global and persistent memory for UDFs, according to an example embodiment.

FIG. 2 is a diagram of another method 200 for providing global and persistent memory for UDFs, according to an example embodiment. The method (herein after referred to as "UDF memory manager") is implemented, resides, and is programmed within a non-transitory machine-readable storage medium for execution by one or more processors of a network. The network may be wired, wireless, or a combination of wired and wireless.

The UDF memory manager presents another and in some cases enhanced perspective of the external memory manager represented by the method 100 and discussed above with reference to the method 100.

At 210, the UDF memory manager superimposes a set data structure onto a block of data housed in one or more database tables of a database. That is, the UDF memory manager logically represents the block of data as if it were a set data structure.

At 220, the UDF memory manager generates mappings for addressing data represented in the set data structure. Examples of this were provided above with reference to GLOP addressing.

At 230, the UDF memory manager provides the mappings in memory for access by the one or more UDFs.

At 240, the UDF memory manager designates a particular UDF to act as a manager of the mappings.

According to an embodiment, at 250, the UDF memory manager reestablishes the mapping when a particular UDF that had terminated processing is reestablished and is reprocessed.

In another situation, at 260, the UDF memory manager creates custom versions of the mappings within the memory for use by different ones of the UDFS.

In yet another case, at 270, the UDF memory manager enforces integrity checking and access control against the set data structure based on policy when the set data structure is accessed by the UDFs via the mappings from the memory.

In another scenario, at 280, the UDF memory manager provides set operations to the UDFS for use against the mappings to access and manipulate the data associated with the set data structure.

Figure 3:
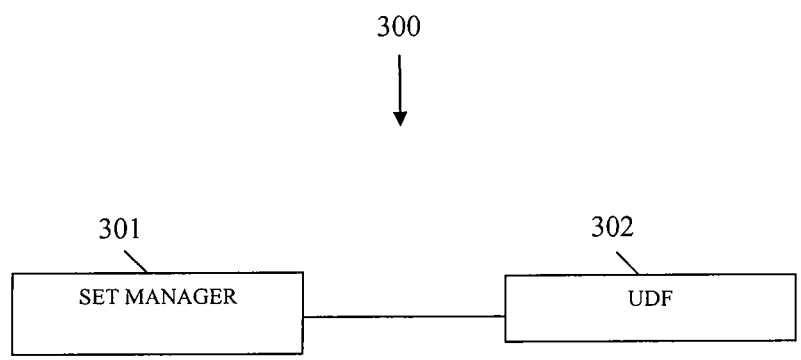
FIG. 3 is a diagram of a global and persistent memory system, according to an example embodiment.

FIG. 3 is a diagram of a global and persistent memory system 400, according to an example embodiment. The components of the global and persistent memory system 400 are implemented, reside, and are programmed in non-transitory machine-readable storage medium. Moreover, the global and persistent memory system 400 includes processors that are specifically configured to process the components and the global and persistent memory system 400 is operational over a network. The network may be wired, wireless, or a combination of wired and wireless.

In an embodiment, the global and persistent memory system 400 implements among other things the method 100 of the FIG. 1 and the method 200 of the FIG. 2.

The global and persistent memory system 400 includes a set manager 301 and a UDF 302. Each of these and their interactions with one another will now be discussed in turn.

A processor is configured with the set manager 301. The set manager 301 is implemented, resides, and is programmed in a non-transitory machine-readable medium and executes on the processor. Example aspects of the set manager 301 were provided above in detail with reference to the methods 100 and 200 of the FIGS. 1 and 2, respectively.

The set manager 301 is configured to organize blocks of data acquired from database tables of a database into a set data structure and provide access to data underlying the set data structure via mappings. The mappings are then provided to the UDF via memory.

The processor or another different processor is configured with the UDF 302. The UDF 302 is implemented within, resides within, and is programmed within a non-transitory machine-readable medium and executes on the processor and/or the different processor. Example aspects of the UDF 302 were provided above with reference to the methods 100 and 200 of the FIGS. 1 and 2, respectively.

The UDF 302 is configured to use the mappings to manipulate and manage the data that underlies the set data structure.

According to an embodiment, the UDF 302 is further configured to share the mappings with other UDFs, request the mappings be re-mapped, and perform other administrative functions on the mappings.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented at least partly by a device that includes one or more processors, the method comprising:
receiving a database command from a user-defined function (UDF) for accessing data stored in a database of a database system, said database command to map memory that is to be used by the UDF;
mapping a block of data in the database system acquired from one or more tables to generate a memory mapping for the UDF, in response to the command from the UDF;
storing the memory mapping for the UDF;
thereafter, providing the stored memory mapping of the UDF for accessing and managing the memory, including the data of the tables associated with the memory mapping, for use by the UDF via set commands issued to the memory mapping within the memory, in response to the command from the UDF;

making management operations available to the UDF for managing the mapping and the data within the tables that are associated with the mapping; and sharing the mappings with other instances of the UDF based on a management instruction received from the UDF.

2. The method of claim 1 further comprising, selectively making-portions of the block of data: read only, read and write accessible, and globally modifiable, via the mappings as instructed by the UDF using a particular management operation.

3. The method of claim 1 further comprising, locking portions of the mapping associated with specific portions of the block of data based on a particular management operation received from the UDF to ensure updates to the data affected can be made without interference from other UDFs accessing the mapping.

4. The method of claim 1 further comprising, permitting selective portions of the mappings to be shared with other mappings as instructed by the UDF via a particular management operation.

5. The method of claim 1 further comprising, receiving revisions to selective portions of the block of data along with conditions from the UDF via a particular management operation where the revisions are not made to the block of data until the conditions are satisfied.

6. The method of claim 1 further comprising mappings based on a role dynamically assumed by the UDF during processing of the UDF.

7. The method of claim 1 further comprising, permitting different mappings to the block of data to be accessed by other UDFs and allowing each UDF to maintain its own version of the block of data without interfering with remaining UDFs that are modifying the block of data with their independent mappings.

8. The method of claim 1 further comprising, retaining a state of the block of data upon termination of the UDF to provide that state of the block of data back to the UDF when it is subsequently reestablished for processing.

9. The method of claim 1 further comprising, automatically reinitializing the mappings on a database boundary, a session boundary, a transaction boundary, a request boundary, a user boundary, a role boundary, and/ or an external routine boundary.

10. The method of claim 1 further comprising, permitting different mappings to the block of data to be accessed by others based on a current user, a current role of a user, or a current context of an external routine that wants to access the mappings.

11. A method implemented at least partly by a device that includes one or more processors, the method comprising:

superimposing a set data structure onto a block of data housed in one or more database tables of a database;

generating mappings for addressing data represented in the set data structure;

providing the mappings in memory for access by one or more User Defined Functions (UDFs); and designating a particular UDF to act as a manager of the mappings.

12. The method of claim 11 further comprising, reestablishing the mappings when a particular UDF that had terminated processing is reestablished and is reprocessed.

13. The method of claim 11 further comprising, creating custom versions of the mappings within the memory for different UDFs.

14. The method of claim 11 further comprising, enforcing integrity checking and access control against the set data structure based on policy when the set data structure is accessed by the UDFs via the mappings from the memory.

15. The method of claim 11 further comprising, providing set operations to the UDFs for use against the mappings to access and manipulate the data associated with the set data structure.

16. A device that includes one or more processors configured to effectively provide a set manager operable to receive a command from a User Defined Function (UDF) of a database to map memory that is to be used by the UDF;

wherein the set manager is also configured to organize blocks of data acquired from database tables of the database into a set data structure and provide access to data underlying the set data structure via mappings in response to the command, wherein the mappings is provided to the UDF via memory, and wherein the UDF is configured to use the mappings to manipulate and manage the data that underlies the set data structure; and wherein the UDF is also configured to share the mappings with other UDFs, request the mappings be re-mapped, and perform other administrative functions on the mappings.

* * * * *